United States Patent [19]
Mockenhaupt et al.

[11] Patent Number: 5,806,857
[45] Date of Patent: Sep. 15, 1998

[54] GASKET LAYER IDENTIFIERS

[75] Inventors: Martin Mockenhaupt, Highland Park; Carl J. Schnecke, Algonquin; Nancy E. Tomaszewski, Gurnee, all of Ill.

[73] Assignee: Fel-Pro Incorporated, Skokie, Ill.

[21] Appl. No.: 847,284

[22] Filed: Apr. 24, 1997

Related U.S. Application Data

[63] Continuation of Ser. No. 492,367, Jun. 19, 1995, abandoned.

[51] Int. Cl.⁶ ....................................................... F16J 15/08
[52] U.S. Cl. ............................ 277/235 B; 277/2; 277/233
[58] Field of Search ..................................... 277/231, 232, 277/233, 235 B, 2, 11, 234, 236

[56] References Cited

U.S. PATENT DOCUMENTS

| | | |
|---|---|---|
| 3,487,732 | 1/1970 | Larson . |
| 3,567,234 | 3/1971 | Skrycki ................................ 277/235 B |
| 4,648,607 | 3/1987 | Yamada et al. . |
| 4,979,758 | 12/1990 | Miyaoh ................................ 277/235 B |
| 5,031,924 | 7/1991 | Beatenbough et al. . |
| 5,131,668 | 7/1992 | Uchida ................................. 277/235 B |
| 5,141,237 | 8/1992 | Yamada et al. . |
| 5,210,943 | 5/1993 | Berkun et al. . |
| 5,232,228 | 8/1993 | Miyoah . |
| 5,281,464 | 1/1994 | Sekicka et al. ...................... 277/235 B |
| 5,330,200 | 7/1994 | Unseth ................................. 277/235 B |
| 5,348,311 | 9/1994 | Miyach et al. ...................... 277/235 B |
| 5,368,316 | 11/1994 | Miyach ............................... 277/235 B |
| 5,375,851 | 12/1994 | Mockenhaupt ...................... 277/235 B |
| 5,415,418 | 5/1995 | Stimpson ............................. 277/235 B |
| 5,443,887 | 8/1995 | Nakao ................................. 277/235 B |

FOREIGN PATENT DOCUMENTS 3610541   10/1987   Germany ............................ 277/235 B

*Primary Examiner*—Daniel G. DePumpo
*Attorney, Agent, or Firm*—Steven P. Shurtz; Brinks Hofer Gilson & Lione

[57] ABSTRACT

A gasket to be positioned between two sealing flanges of an internal combustion engine includes a plurality of stacked gasket layers. Each layer has two opposing generally planar surfaces and predetermined thickness. At least one of the gasket layers has a surface projection at a predetermined height above its generally planar surface and another layer defines a void. The surface projection is situated so that the projection aligns with and extends into the void. The combined thicknesses of the gasket layers is not increased by the height of the surface projection.

8 Claims, 3 Drawing Sheets

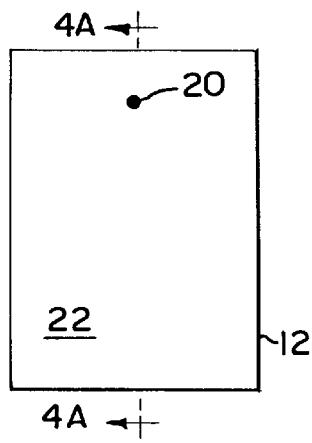
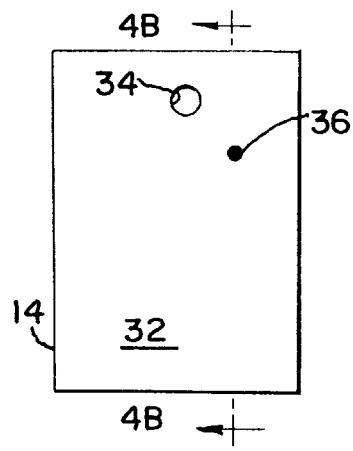
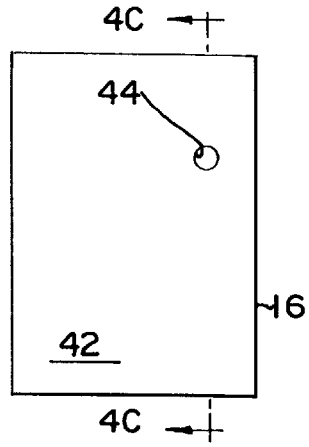
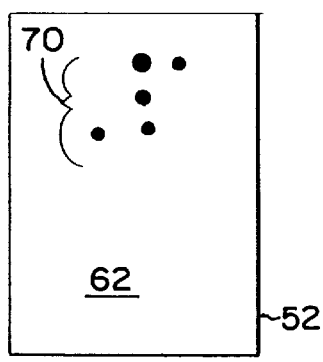
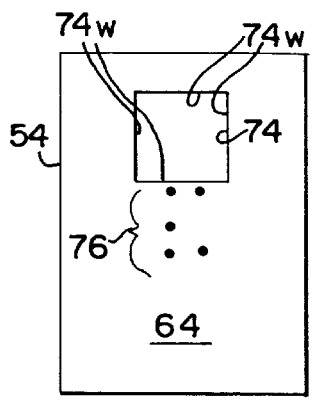
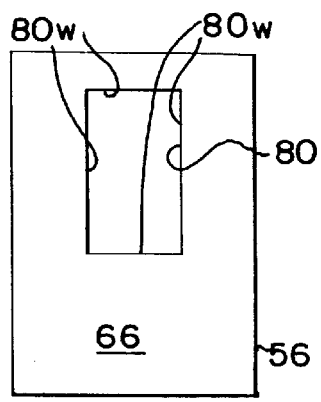
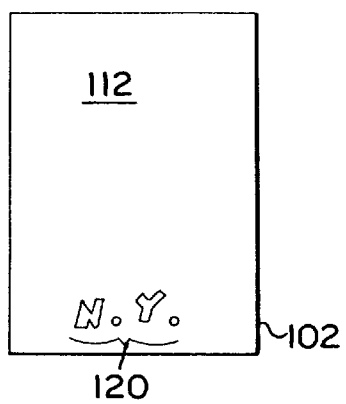
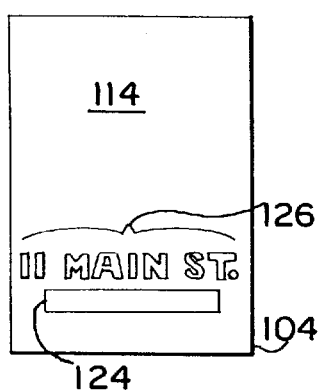
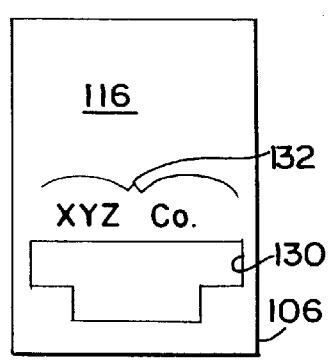

GASKET LAYER IDENTIFIERS

This application is a continuation of application Ser. No. 08/492,367, filed Jun. 19, 1995 now abandoned.

BACKGROUND OF THE INVENTION

This invention relates to laminated gaskets and in particular, to multi-layer gaskets with identifiers for insuring that the layers are assembled in the desired order.

Laminated or multi-layer gaskets are frequently used in connection with sealing between internal combustion engine parts and around fluid openings. Each of the layers of such gaskets is usually of a generally similar configuration to the other layers, but it often includes different functional features or characteristics. For example, one or more of the layers may include embossments or coatings, while other layers may be flat and include a different coating or no coating at all. For the gasket to function properly, these layers must be assembled in the proper order; otherwise, the gasket may fail, leading to possible engine failure or damage, which is usually a costly problem to fix.

In this day of mass production, it is relatively easy for multi-layer gaskets to be improperly assembled. Each layer is mass produced according to the specific characteristics of that layer, and then the necessary layers for a particular gasket must be stacked in the proper sequence or assembly order and fastened together, as with clinching tabs or the like. Once the layers are fastened together, they are inspected to verify an accurate sequence and for compliance with that particular gasket's specifications. This is a time consuming but critical process.

Others have devised ways to check the assembly order. U.S. Pat. No. 4,648,607 discloses a laminate gasket with side extensions at corners of the layers. When the layers are properly stacked, the projections form a stepped portion with different heights relative to the horizontal plane of the gasket. U.S. Pat. No. 5,232,228 and U.S. Pat. No. 5,210,943 disclose laminated gaskets including a first metal plate with a notch or elongated hole and a second plate with a plate information sign in the form of dents or holes located at an area visible through the notch or elongated hole. U.S. Pat. No. 5,210,943 shows a gasket with holes in various layers and a sensing device positioned approximately relative to the holes for checking proper sequence.

Each of these gaskets depends upon side extensions of the gasket layers, a visual inspection of the various layers, or a separate sensing device to verify the proper assembly order. The use of side extensions requires additional metal or other gasket material to form and machine. The gasket dependent on visual sensing must be examined under suitable lighting conditions to detect improper assembly order, and those conditions are not always available in a factory.

In addition, only assembly order can be determined using the prior art devices. More detailed information, such as the material composition of the layer, the manufacturer's name, and similar information cannot be transmitted on interior layers of multi-layer gaskets using the prior art devices. This information may be useful to the user or installer of the gasket, for example, to determine whether the gasket is appropriate for a particular engine.

Therefore, there is a need for a simple means for detecting an improperly assembled multi-layer gasket which is not dependent on unusual lighting conditions or special sensing equipment. There is also a need for a means to communicate gasket information besides the assembly order to someone using the gaskets.

SUMMARY OF THE INVENTION

According to the present invention, a gasket to be positioned between two sealing flanges of an internal combustion engine includes a plurality of stacked gasket layers. Each layer has two opposing generally planar surfaces and a predetermined thickness. At least one of the gasket layers has a surface projection at a predetermined height above its generally planar surface and another layer defines a void. The surface projection is situated so that the projection aligns with and extends into the void. The combined thicknesses of the gasket layers is not increased by the height of the surface projections.

BRIEF DESCRIPTION OF THE DRAWINGS

FIGS. 3A, 3B, and 3C are schematic plan views of portions of three gasket layers according to a first embodiment of the invention;

FIGS. 5A, 5B, are 5C are schematic plan views of portions of three gasket layers according to a second FIGS. 6A, 6B, and 6C are schematic plan views of portions of three gasket layers according to a third embodiment of the invention;

DETAILED DESCRIPTION OF THE PREFERRED EMBODIMENTS

Figure 1:
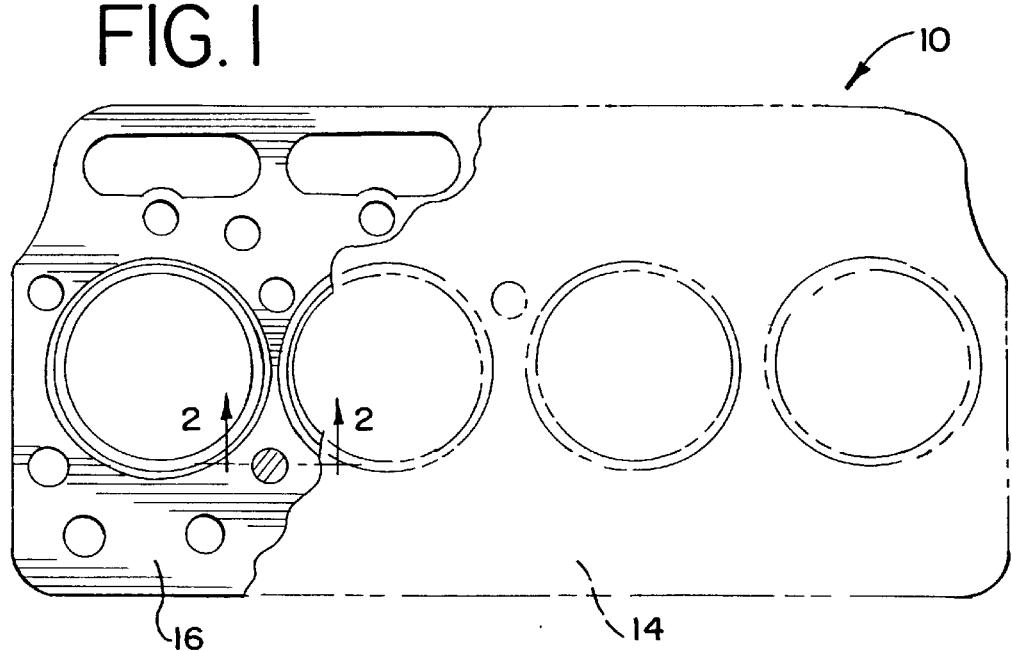
FIG. 1 is a plan view of a typical multi-layer gasket constructed according to the invention.
Figure 2:
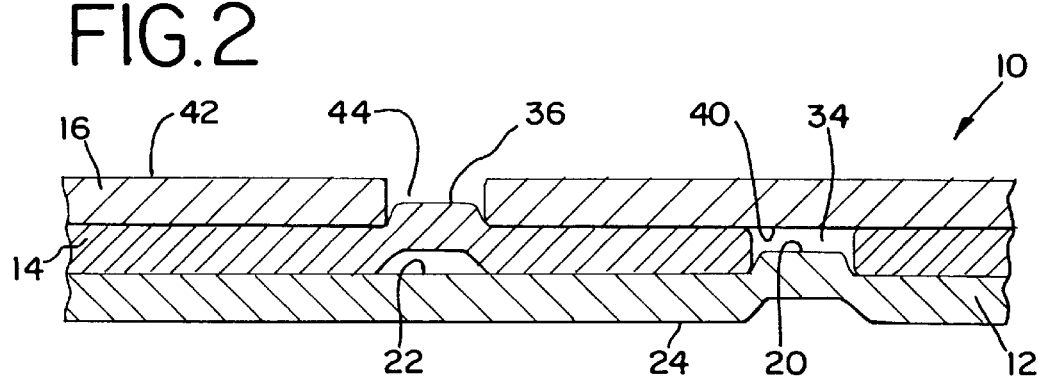
FIG. 2 is an enlarged cross-sectional view taken substantially along line 2—2 of FIG. 1.

Multi-layer gasket 10 constructed in accordance with a first embodiment of the invention is shown in FIGS. 1, 2, and 3A–C. Gasket 1 is a head gasket for insertion between confronting sealing flanges of an internal combustion engine, but other types of gaskets for internal combustion engines may also be constructed according to the invention. The gasket 10 has three layers 12, 14, and 16, but a different number of layers greater than one may also utilize the principles of the invention. The gasket when assembled has the layers stacked one atop the other, as shown in FIGS. 1 and 2, but they are shown schematically and disassembled in FIGS. 3A, 3B and 3C for illustrative purposes. The embodiments of FIGS. 5A, 5B and 5C and of FIGS. 6A, 6B and 6C are also shown schematically and disassembled.

Figure 4A:
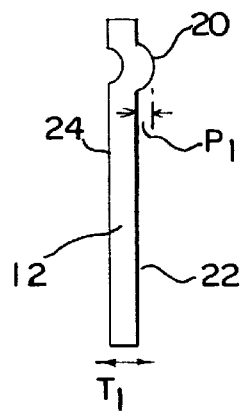
FIGS. 4A, 4B, and 4C are cross-sectional views of the three gasket layers of FIGS. 3A, 3B and 3C respectively, taken along lines 4A—4A, 4B—4B and 4C—4C, respectively.

Each layer 12, 14, and 16 has a defined thickness, although each layer does not necessarily have the same thickness. The thickness of layer 12, for example, is shown with thickness $T_1$ in FIG. 4A. Layers 12, 14 and 16 are formed of an embossable material, typically metal, although their surfaces may be coated with various substances for improved sealing characteristics. Layer 12 defines an embossment or projection 20 formed integrally with the remainder of layer 12 and located in a selected position on surface 22 of layer 12. Embossment 20 has a pre-determined height $P_1$, above surface 22. Layer 12 includes two main opposing surfaces: surface 22 which confronts an adjoining layer 14, and surface 24, which is an external, non-layer-confronting surface.

Figure 4B:
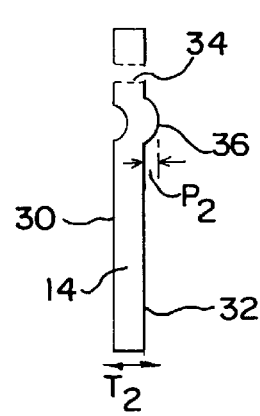

Layer 14 is shown in FIGS. 2, 3B and 4B. It also includes two main opposing surfaces 30, 32, both of which are layer-confronting surfaces because layer 14 is sandwiched between layers 12 and 16. Layer 14 further defines a hole 34 extending through its thickness $T_2$ and between surfaces 30, 32, and another embossment 36. Embossment 36 has a predetermined height $P_2$ above surface 32. Hole 34 is located so that when layer 14 is placed adjacent to layer 12, with surfaces 30 and 22 confronting each other, embossment 20 will extend into hole 34. Layer 14 has a thickness $T_2$, and $T_2$ is equal to or greater than height $P_1$ of embossment 20. This insures that embossment 20 will not protrude completely through hole 34 or beyond surface 32. Embossment 36 is located at a selected position on surface 32 offset from hole 34.

Figure 4C:
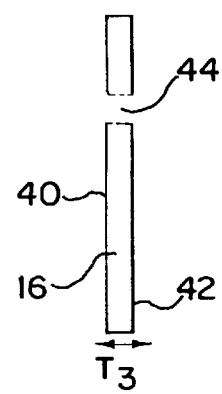

Layer 16 is shown in FIGS. 2, 3C and 4C. It includes two main opposing surfaces 40, 42, where surface 40 is a layer-confronting surface and surface 42 is another external, non-layer-confronting surface. Layer 16 further includes a hole 44 extending through its thickness $T_3$. Hole 44 is located so that when layer 16 is placed adjacent to layer 14, with surfaces 40 and 32 confronting each other, embossment 36 will extend into hole 44. Thickness $T_3$ of layer 16 is equal to or greater than height $P_2$ of embossment 36, so that embossment 36 will not protrude completely through hole 44 or beyond surface 42.

The three layers 12, 14, 16 are eventually stacked and secured together into a single gasket 10 as is conventionally done by clinching or other suitable means, so that layer 14 is between layers 12 and 16. Surfaces 24 and 42 of layers 12 and 16, respectively, are exterior-facing. Significantly, the combined thickness of the gasket T, which is equal to $T_1+T_2+T_3$, is not increased or affected by the embossments, due to the mating relationship of the embossments 20, 36 with the holes 34, 44. If layers 12, 14, 16 were to be stacked in an improper order, however, the embossments would not mate with holes in the confronting layers and there would be an increased thickness to the gasket which would be obvious both visually and tactilely.

Furthermore, if the diameter of the embossment is approximately equal to (but not greater than) the diameter of the mating hole, the layers will be properly aligned laterally, as well as properly stacked vertically. This is because the snug fit of the embossment into the hole resists lateral displacement.

A second embodiment of the invention is shown schematically in FIGS. 5A, 5B and 5C. Layers 52, 54 and 56 are similar to layers 12, 14, 16, respectively, in terms of being of an embossable material composition and insofar as they each have a pair of main opposing surfaces. Layer 52 has an exterior-facing surface (not shown) and an opposing layer-confronting surface 62. Layer 54 has two opposing layer-confronting surfaces, only one of which is shown at 64. Layer 56 has a layer-confronting surface (not shown) and an opposing exterior-facing surface 66. Layers 52, 54 and 56 have thicknesses which may or may not be equal to each other.

Layer 52 includes a plurality of embossments 70 projecting above surface 62. The embossments are arranged in a selected position in layer 52 in an information-indicating pattern, such as the Braille symbol for the numeral "1".

Layer 54 includes an opening or window 74 extending between its two main opposing surfaces and appropriately located and of sufficient size so that when layer 54 is stacked adjacent to layer 52, all of embossments 70 are detectable through opening 74. In addition, layer 64 includes a plurality of embossments 76 projecting above surface 64. These embossments 76 are also arranged in a selected position on layer 54 and in an information-indicating pattern, in this case the Braille symbol for the numeral "2".

Layer 56 includes an opening 80 extending between its two main opposing surfaces and appropriately located and of sufficient size so that when layer 56 is stacked adjacent to layer 54, the embossments 70 of layer 52 and the embossments 76 of layer 54 are both detectable through opening 80. As with the first embodiment, the three layers 52, 54, and 56 are eventually stacked and secured together in a conventional manner, with layer 54 between layers 52 and 56. Embossments 70 have a maximum height equal to or less than the thickness of layer 54 plus the thickness of layer 56. Embossments 76 have a maximum height equal to or less than the thickness of layer 56. Consequently, the thickness of the gasket, which is equal to the combined thicknesses of the layers, is not increased or affected by the embossments. If the layers were stacked in an improper order, all of the embossments would not be visually or tactilely detectable and the gasket would have an obviously larger thickness than other gaskets of the same type, due to the lack of mating relationship between the embossments and the openings.

If desired, the embossments 70, 76 may be positioned so that at least some of them engage the walls $74w$, $80w$ of openings 74, 80 respectively. This arrangement would laterally align the layers 52, 54 and 56 relative to each other.

A third embodiment of the invention is shown schematically in FIGS. 6A, 6B and 6C. Layers 102, 104, and 106 are similar to the layers of the first and second embodiments, in that they have an embossable material composition as of metal and each have a pair of main opposing surfaces. Layer 102 has an exterior-facing surface (not shown) and an opposing layer-confronting surface 112. Layer 104 has two opposing layer-confronting surfaces, only one of which is shown at 114. Layer 106 has a layer-confronting surface (not shown) and an opposing exterior-facing surface 116. Layers 102, 104, and 106 have thicknesses which may or may not be equal to each other.

Layer 102 includes a plurality of raised indicia 120, which may be embossed above surface 112 to a predetermined height. This height is less than or equal to the combined thicknesses of layers 102, 104. Again, the embossments 102 are arranged in a selected position on layer 102 in an informatian-indicating pattern, such as the abbreviation "N.Y."

Layer 104 includes an opening or window 124 extending between its two main opposing surfaces and approximately located and of sufficient size so that when layer 104 is stacked adjacent to layer 102, embossments 120 are detectable through opening 124. Layer 104 further includes a plurality of raised indicia 126, which are embossed above surface 114 to a predetermined height. This height is less than or equal to the thickness of layer 104. Embossments 126 are also arranged in a selected position on layer 104 and in an information-indicating pattern relative to embossments 120, such as the street address "11 Main St."

Layer 106 includes an opening 130 extending between its two main opposing surfaces and appropriately located and of sufficient size so that when layer 106 is stacked adjacent to layer 104, the embossments 126 of layer 104 and the embossments 120 of layer 102 are both detectable through opening 130. Layer 106 further includes indicia 132 which are preferably engraved, etched or printed on surface 116 so as not to extend above surface 116. Indicia 132 may be information which completes the identifying information contained on layers 104 and 102, such as a company name "XYZ Co.". Thus, indicia 132 is appropriately located relative to embossments 120, 126, and opening 130 so that the information expressed on all three layers combines to form an integrated message, and the correct assembly order of the layers is therefore apparent. As with the other two embodiments, the combined thicknesses of the layers is not increased or affected by the raised indicia so long as the layers are stacked in the proper order. If the layers were inappropriately stacked, all of the embossments would not be visually and tactilely detectable, and the gasket would have an obviously larger thickness as compared to properly stacked gaskets of the same type.

As was true with the second embodiment, the embossments of the third embodiment may be arranged so that they snugly engage the walls of the openings in the layers above them when the layers are properly stacked, thereby laterally aligning the gasket layers.

Figure 7:
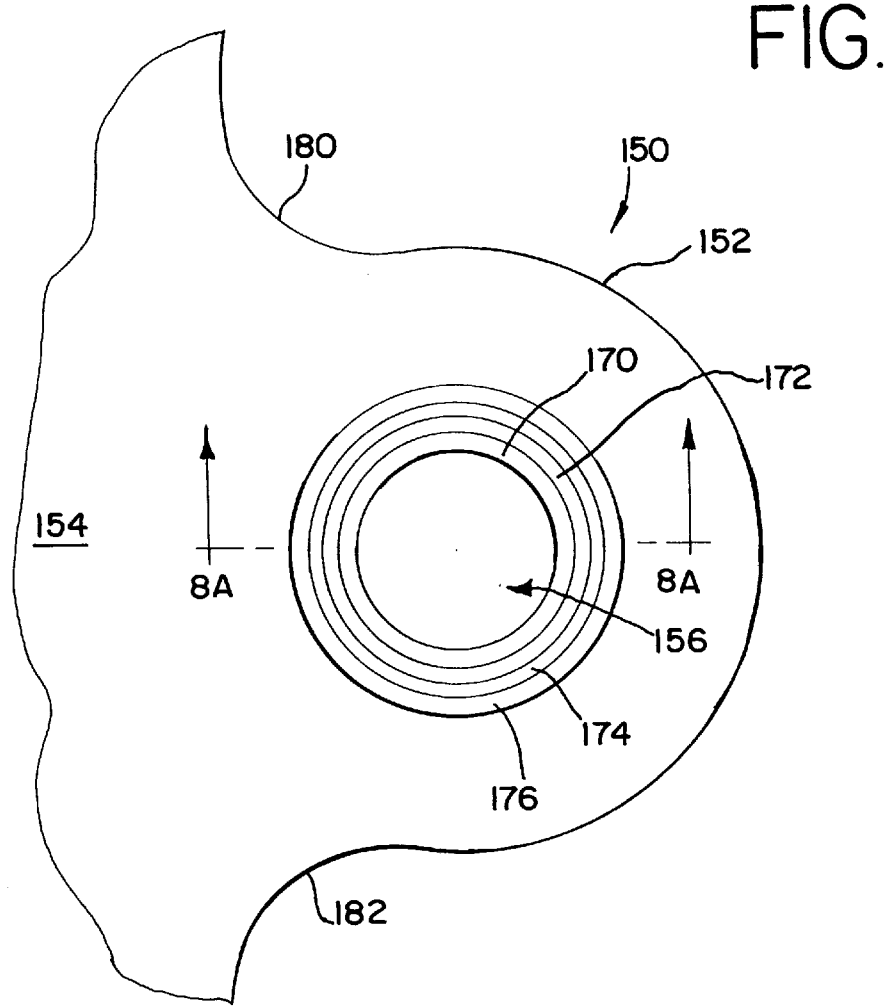
FIG. 7 is a plan view of the tab region of a gasket according to a fourth embodiment of the invention.
Figure 8:
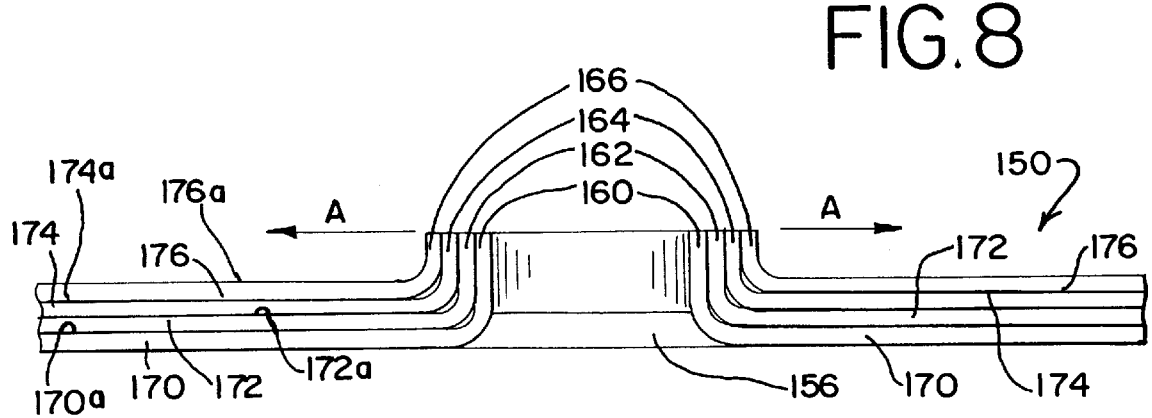
FIG. 8 is a cross sectional view of the gasket of FIG. 7 taken along line 8A—8A.

A fourth embodiment is shown in FIGS. 7 and 8. Gasket 150 is a multi-layer gasket which has a tab region 152 which extends laterally away from the main gasket body 154. Tab region 152 sits spaced apart from or remote from the sealing flanges of the confronting engine parts (not shown) between which gasket 150 is to be positioned, so that only main gasket body 154 actually confronts the engine parts. The tab region 152 results from a conventional gasket blanking process, wherein void zones 180, 182 on either side of the tab region result from removing gasket material at the edge or perimeter of the gasket blank. Tab region 152 includes a series of coaxially aligned voids or holes in the layers indicated generally by 156 into which extend the exposed formed edges 160, 162, 164 and 166 of gasket layers 170, 172, 174 and 176, respectively. The edges each project generally perpendicularly away from the layer-confronting surfaces 170a, 172a, and 174a and exterior surface 176a of layers 170, 172, 174 and 176, respectively. The edges preferably terminate in a common plane indicated by arrow A (FIG. 8). This plane is spaced apart from and parallel to the generally planar gasket layers.

Like the other gasket embodiments, this embodiment also includes means which indicate if the gasket layers are assembled in an improper sequence. If the layers are improperly ordered, the edges will not align with the voids in the layers above and the layers will not neatly nest so that the layer-confronting surfaces actually confront the adjacent layer. Instead, the edge of an improperly ordered layer will space the adjoining layer away, leaving a noticeable gap and an increased thickness to the gasket as compared with a properly assembled gasket. Further, the edges will not terminate in a common plane if the layers are improperly ordered. Properly nested edges will also laterally align the gasket layers in the desired manner.

These are only examples of the modifications and variations of the invention which can be effected without departing from the spirit and scope of the invention. The invention is not intended to be limited by the embodiments described and illustrated, but is instead to be understood in accordance with the appended claims.

What is claimed is:

1. A gasket for an internal combustion engine and having an assured correct order of assembly, said gasket comprising:
    at least three gasket layers, each of said layers being generally flat and having top and bottom planar surfaces and a predetermined thickness, said layers being stacked on one another;
    at least two of said gasket layers having at least one surface embossement projecting to a predetermined height beyond one of its generally planar surfaces, and each of at least two of said layers defining a clear-through void therein, each of said voids being aligned with and receiving therein the embossment of another of said layers, the alignment of voids and embossments in at least two of said layers indicating the correct order of assembly of said gasket layers.

2. A gasket to be positioned between two sealing flanges of an internal combustion engine, said gasket comprising at least three gasket layers and having means for assuring the correct order of assembly of said gasket layers:
    said first layer having a first surface and an opposite second surface, said second surface confronting a second layer;
    said second layer having a first surface and an opposite second surface, said first surface of said second layer confronting said second surface of said first layer;
    said second layer further having a clear-through opening extending between said first and second surfaces of said second layer, said clear-through opening overlying a pre-determined area of said second surface of said first layer;
    said third layer having a first surface and an opposite second surface, said first surface of said third layer confronting said second surface of said second layer;
    said third layer further having a clear-through opening extending between said first and second surfaces of said third layer, said clear-through opening overlying both a predetermined zone of said second surface of said second layer and said pre-determined area of said second surface of said first layer; and
    indicia on said second surface of said first layer, said indicia located within said predetermined area and having a height above said second surface of said first layer not greater than the thickness of said clear-through opening in said second layer; and
    indicia on said second surface of said second layer, said indicia located within said predetermined zone and having a height above said second surface of said second layer not greater than the thickness of said clear-through opening in said third layer.

3. The gasket of claim 2 wherein said indicia on said layers are embossments arranged in an information-indicating pattern.

4. The gasket of claim 2 wherein said clear-through openings comprise windows in each overlying layer, said indicia on said layers forming a single integrated message.

5. A gasket for an internal combustion engine, said gasket having means for assuring the correct assembly of its gasket layers, said gasket including an assemblage of three gasket layers, each of said three gasket layers being generally flat and having top and bottom planar surfaces, said three gasket layers being stacked one on top of the other, each of said three gasket layers comprising a main gasket body and an outer tab region, and in said outer tab regions of two of said three gasket layers a projection extending away from a planar surface thereof, and an opening defined in the third gasket layer, said projections being aligned and in a nesting relationship with each other and being aligned with and together nesting within said opening defined in said third gasket layer, each of said projections terminating at a point spaced apart from said gasket layers.

6. A gasket in accordance with claim 5, and wherein each of said projections defines an opening coaxial with said opening in the third gasket layer.

7. A gasket in accordance with claim 6, and wherein each said projection extends into an opening in an adjacent one of said three layers.

8. A gasket in accordance with claim 5, and wherein said projections terminate in a common plane.

\* \* \* \* \*

UNITED STATES PATENT AND TRADEMARK OFFICE
CERTIFICATE OF CORRECTION

PATENT NO. : 5,806,857
DATED : September 15, 1998
INVENTOR(S) : Martin Mockenhaupt et al.

It is certified that error appears in the above-identified patent and that said Letters Patent is hereby corrected as shown below:

In the Claims

Claim 1,
Line 9, please change "embossement" to --embossment--.

Signed and Sealed this

Third Day of July, 2001

Attest:

NICHOLAS P. GODICI
Attesting Officer
Acting Director of the United States Patent and Trademark Office